United States Patent [19]

Kikuchi et al.

[11] Patent Number: 4,557,566
[45] Date of Patent: * Dec. 10, 1985

[54] SPHERICAL LENS FOR SPHERICALLY SYMMETRICAL GRADED REFRACTIVE INDEX DISTRIBUTION PROVIDED WITH ROD CLAD

[75] Inventors: Keisuke Kikuchi, Ibaraki; Takitaro Morikawa, Sayama; Junichi Shimada, Ibaraki; Kenjiro Sakurai, Tokyo, all of Japan

[73] Assignees: Agency of Industrial Science & Technology; Ministry of International Trade & Industry, both of Tokyo, Japan

[*] Notice: The portion of the term of this patent subsequent to Dec. 27, 2000 has been disclaimed.

[21] Appl. No.: 362,500

[22] Filed: Mar. 26, 1982

[30] Foreign Application Priority Data

May 1, 1981 [JP] Japan ................... 56-66612

[51] Int. Cl.[4] .......................... G02B 5/14; G02B 5/16; G02B 9/02
[52] U.S. Cl. ................... 350/413; 350/96.19; 350/416
[58] Field of Search ............. 350/411, 413, 416, 96.19, 350/96.25

[56] References Cited

U.S. PATENT DOCUMENTS

| | | | |
|---|---|---|---|
| 2,273,847 | 2/1942 | Eckel | 350/413 X |
| 3,666,347 | 5/1972 | Kitano et al. | 350/413 X |
| 4,268,112 | 5/1981 | Peterson | 350/413 X |
| 4,327,963 | 5/1982 | Khoe et al. | 350/413 X |
| 4,422,733 | 12/1983 | Kikuchi et al. | 350/413 |

*Primary Examiner*—John K. Corbin
*Assistant Examiner*—Scott J. Sugarman
*Attorney, Agent, or Firm*—Kurt Kelman

[57] ABSTRACT

A spherical lens of graded refractive index distribution comprises a core of uneven refractive index of the shape of a sphere or hemisphere and a clad of the shape of a spherical shell and a rod clad, with the two clads disposed on the periphery of the core. By the combination of the core showing negative aberration characteristic and the spherical-shell type clad and the rod clad both showing positive aberration characteristic, there can be formed a lens of corrected aberration. This lens suits combination or integration with other elements and permits easy manufacture of clads. It also provides effective convergence of beams of light desirable for use in an optical pickup, for example.

10 Claims, 38 Drawing Figures

lateral aberration : At

(lateral aberration/$r_0$) ×10³

(lateral aberration/$r_0$) × 10³

Fig_12

Fig_13

Fig_16

Fig_19

Fig_20

Fig_21

Fig_22

Fig_23

Fig_24

Fig_25

Fig_26  Fig_27  Fig_28

Fig_29  Fig_30

Fig_31

SPHERICAL LENS FOR SPHERICALLY SYMMETRICAL GRADED REFRACTIVE INDEX DISTRIBUTION PROVIDED WITH ROD CLAD

BACKGROUND OF THE INVENTION

This invention relates to a spherical lens provided with a rod clad of a construction enabling correction of spherical aberration.

The optical coupling lenses, Fourier transformation lenses, optical pickup lenses, image relay lenses, etc. used in optoelectronics systems for optical communication, optical data processing, optical recording and playback, etc. are required to be small in size and short in focal length for permitting miniaturization of system, to excel in lens characteristics for avoiding degradation of the overall system performance, and to be simple in construction for better adaptability to mass production. The spherical lens, which has a short focal length and a simple construction, may appear to meet all these requirements. Its use is, however, not feasible because it suffers from strong spherical aberration. Maxwell's fish-eye lens and Luneburg's lens require a very large refractive gradient. With Toraldo's modified Luneburg lens and Morgan's generalized Luneburg lens, it is possible to converge light on the surface of the lens or outside the lens without aberration even though they have a refractive index of small gradient but these lenses cannot be realized with the technology for controlling refractive index distribution available at present.

The inventors formerly proposed a spherical lens of high quality specially designed to hold down the spherical aberration to a practically tolerable extent (U.S. Ser. No. 244,915 filed Mar. 18, 1981, now U.S. Pat. No. 4,422,733). The spherical lens thus pproposed comprises a spherical or hemispherical core possessed of spherically symmetrical refractive index distribution and a clad of the shape of a spherical shell possessed of uniform refractive index and formed on the periphery of the core. The spherical lens has negative lateral aberration and the lens of the shape of a spherical shell, in contrast, has positive lateral aberration. Thus, the idea of selecting for the spherical shell a specific thickness optimum with respect to the refractive index distribution peculiar to the core and combining the core and the clad satisfying this relationship has led to the perfection of a spherical lens which has little spherical aberration. Indeed the spherical lens with the clad fulfills the requirements mentioned above. It has often been desired, however, to offer functions which are desirable from the standpoint of actual application. To be specific, with the spherical lens constructed as described above, (i) the light source and the image point are separated too much from the lens to permit intimate integration of the lens with other elements, (ii) the surface area in which the clad of a uniform thickness is required to be applied is too large to permit easy manufacture of the lens, (iii) while the lens, when used for an optical pickup, requires the light to be passed through a transparent disk about 1 mm in thickness and converged on the rear side and, therefore, necessitates provision of a certain distance to the focal point, the lens having a core radius of the level of 2 mm does not permit its focal point readily to reach the space behind the disk of a thickness of the level of 1 mm because of the thickness of the clad on the disk side and the concave lens effect of the surface of this clad, and (iv) when the lens is used as an essential element in the formation of a flexible light transmission path, the number of component lenses required increases and the loss of surface reflectance accordingly increases. The spherical lens in question, therefore, has been desired to be improved to preclude the faults mentioned above.

SUMMARY OF THE INVENTION

An object of this invention is to provide a spherical lens for spherically symmetrical graded refractive index distribution provided with a rod clad which is characterized by enabling the light source or the image plane to approach or come into intimate contact with the lens thereby materializing miniaturization of system and intimate integration of the lens with other elements, reducing the area occupied by the clad of the shape of a spherical shell to the fullest possible extent thereby facilitating the manufacture of the clad of a uniform thickness, enabling the lens, when used in an optical pickup, to increase its focal length enough to form the focal point on the surface of the disk pit, lessening the overall loss due to the interface reflection when the lens is used as an essential element in a light transmission path, and further curbing the spherical aberration by ready control of the refractive index distribution of the core.

To accomplish the object described above according to the present invention, there is provided a spherical lens for spherically symmetrical graded refractive index distribution provided with a rod clad, which comprises a core forming at least part of a sphere and possessing a spherically symmetrical graded refractive index distribution, a clad of the shape of a spherical shell having a uniform thickness and provided on part of the spherical surface of the core, and a rod clad provided on part of the spherical surface of the core.

The spherical lens mentioned above is constructed so that the incident light will enter either the clad of the shape of a spherical shell or the rod clad, pass through the spherical core, and issue out of the remaining one of the two clads. The spherical core shows negative lateral aberration and the two clads show positive lateral aberrations. When the clads are given thicknesses which best suit the refractive index distribution of the core falling within a specific range, therefore, the spherical lens of the aforementioned construction enjoys a high degree of correction of its spherical aberration.

The rod clad included in the construction described above plays an important role in the fulfillment of the object of this invention. Since it effects the correction of aberration in cooperation with the spherical surface side clad and permits free selection of its own length, it can be integrated with other optical elements for reflection, diffraction, and interference, to say nothing of optical fibers. An optical pickup lens can be constructed by having a gap cut out of its rod portion and utilizing the severed portion as an improvised disk. Further, the spherical lenses of this invention can be joined back to back with their respective rod portions held in direct contact, and the resultant composition can be used, with their combined length appropriately adjusted, as an essential element for the formation of an optical transmission path. The incorporation of the rod portion serves to reduce the surface of the spherical shell which is difficult to manufacture. When the spherical clad is polished, the rod can be utilized as a handy support. Thus, the spherical lens of this invention offers a number of desirable effects.

The other objects and characteristics of the present invention will become apparent from the further disclosure of the invention to be made hereinbelow with reference to the accompanying drawing.

DESCRIPTION OF THE PREFERRED EMBODIMENTS

This invention relates to a spherical lens for spherically symmetrical graded refractive index distribution, which comprises a spherical core, a spherical-shell clad, and a rod clad and which has little aberration.

First, the principle which underlies the correction of aberration in the lens of the present invention will be described with reference to FIGS. 1 through 3.

Figure 1A:
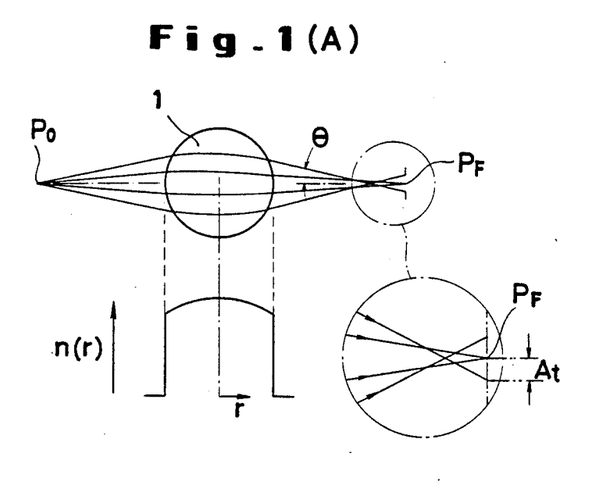
FIGS. 1(A) and 1(B) are a schematic structural diagram of a monospherical lens of a spherically symmetrical graded refractive index distribution to as a core in the lens of this invention and a diagram showing the aberration characteristics of the monospherical lens.
Figure 1B:
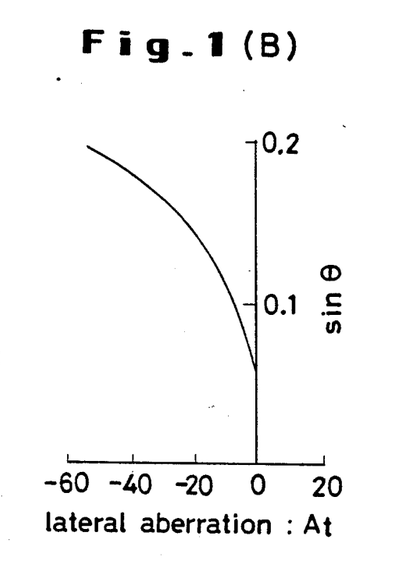

FIG. 1 illustrates the aberration characteristics in a graded refractive index lens of a shape intended to serve as a core 1 in the lens of this invention. The spherical lens 1 has such a degree of spherically symmetrical graded refractive index distribution as will be imparted by a treatment such as by ion-exchange, for example. When this lens is placed in air, the beam issuing from one point $P_O$, cannot be converged at one point $P_F$, on the opposite side of the lens 1 without entailing aberration, as illustrated in FIG. 1(A). The magnitude of the aberration produced in this case is plotted as a function of the angle $\theta$, which the converged beam forms with the optical axis at the image forming point $P_F$ in FIG. 1(B). The lateral aberration $A_t$, which is graduated along the horizontal axis of this graph refers to the distance by which the beam converging at the angle of its own deviates from the optical axis in the plane transversing the image forming point $P_F$ formed by the convergence of the paraxial beam of $\theta \approx 0$ and perpendicularly intersecting the optical axis. The negative lateral aberration represents the case in which the convergence occurs on the side closer to the lens than to the point of convergence of the paraxial beam. In FIG. 1(A), therefore, a negative lateral aberration is illustrated.

Figure 2A:
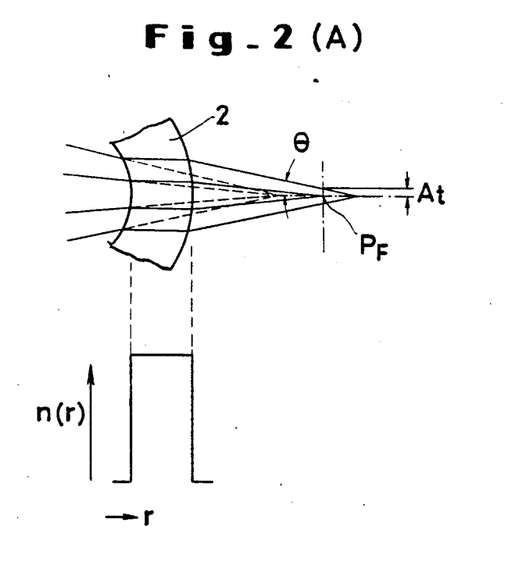
FIGS. 2(A) and 2(B) are a schematic structure diagram of a clad of the shape of a spherical shell in the lens of this invention and a diagram showing the aberration characteristics of the clad.
Figure 2B:
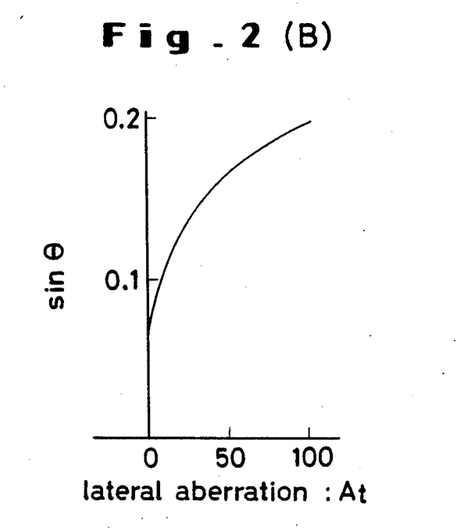

FIG. 2(A) illustrates that, contrary to the preceding case, a positive lateral aberration $A_t$ occurs when a collimated beam passes through a spherical-shell medium 2 of a uniform refractive index from the left to the right. The broken lines represent the paths of light which the collimated beam ought to follow in the absence of the spherical-shell medium 2. FIG. 2(B) illustrates the amount of positive lateral aberration produced as a function of the angle $\theta$, which the collimated beam forms with the optical axis, similarly to FIG. 1(B).

In the case where the spherical-shell medium 2 of uniform refractive index forms a curved surface opposite the curved surface of FIG. 2(A) relative to the direction of the travel of light, the beam which issues from one point and passes through this medium is refracted more outwardly in proportion to the outwardness of the point of origin as might be imagined by viewing the diagram of FIG. 2(A) in a horizontally reversed state. When the beams are converged, therefore, those beams on the outer sides are converged at a position farther from the medium 2 than those on the inner sides, with the result that there is generated a positive lateral aberration as illustrated in FIG. 2(B). The same trend persists even by moving the position of the light source to infinity and allowing the beams to be collimated before impingement on the medium.

Figure 3A:
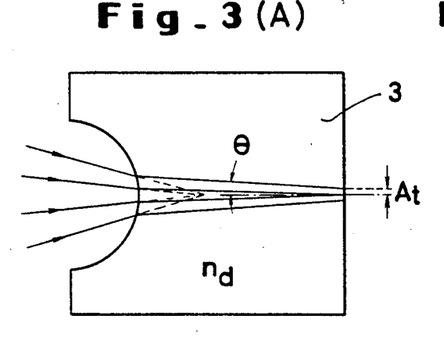
FIGS. 3(A) and 3(B) are a schematic structural diagram of a rod clad in the lens of this invention and a diagram showing the aberration characteristics of the rod clad.
Figure 3B:
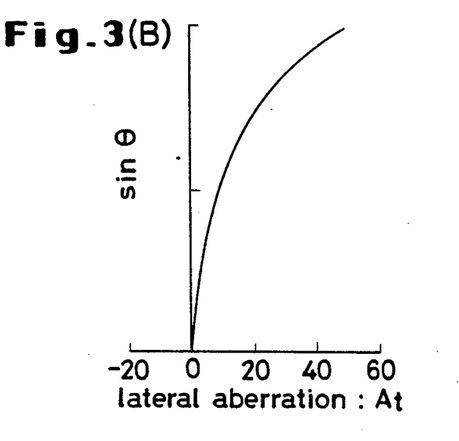

FIG. 3(A) illustrates paths of beams of light through a rod-shaped medium 3 and FIG. 3(B) illustrates the aberration characteristics of the medium. As noted from these diagrams, this rod medium 3 also possesses a positive aberration similarly to the spherical-shell medium. In the absence of the medium, the beams of light ought to converge at a point as indicated by the dotted lines. In the presence of the medium 3, the beams forming a large angle $\theta$, with the optical axis cross the optical axis at a farther point than the paraxial beams and, therefore, give rise to a positive aberration. FIG. 3(A) illustrates a case in which the image point falls on the end surface of the rod. When the light source is placed at the point of image, the beams of light on the outer sides are refracted more outwardly in proportion to the outwardness and function as a positive aberration as might be imagined by viewing the diagram of FIG. 3(A) in a horizontally reversed state. This also applies to the case in which a collimated beam is used.

As is apparent from the description given above, when the spherical lens 1 of graded refractive index distribution having a negative lateral aberration illustrated in FIG. 1(A) and a medium of the shape of a spherical shell or rod having a positive lateral aberration illustrated in FIG. 2(A) or 3(A) are suitably combined, the positive and negative lateral aberrations cancel each other to effect the correction of aberration called for. The first embodiment of the invention which is based on the principle described above is illustrated in FIGS. 4(A), 5(A) and 7(A).

Figure 4A:
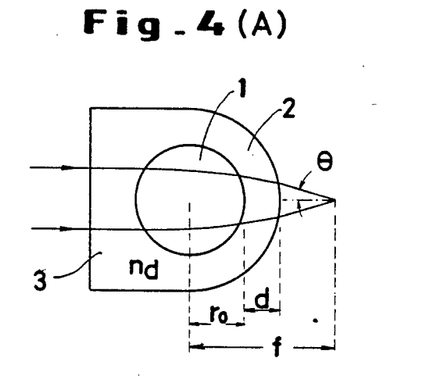
FIGS. 4(A) and 4(B) are a schematic structural diagram of the first embodiment of the lens of this invention, illustrating the condition of the incidence of a collimated beam from the rod clad side, and a diagram showing the aberration characteristics.
Figure 4B:
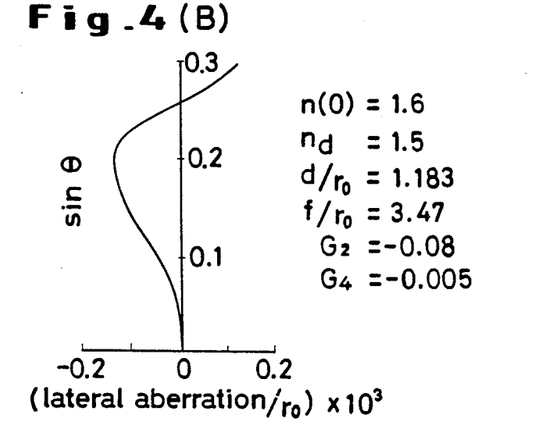
Figure 5A:
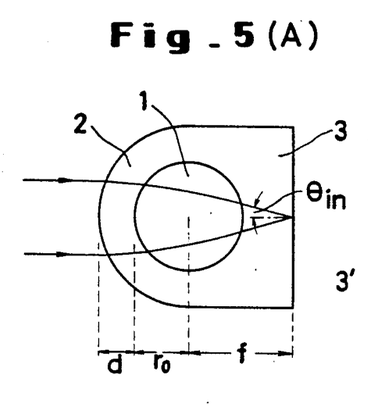
FIGS. 5(A) and 5(B) are a schematic structural diagram of the same first embodiment, illustrating the condition of the incidence of a collimated beam from the spherical shell clad side, and a diagram showing the aberration characteristics.
Figure 5B:
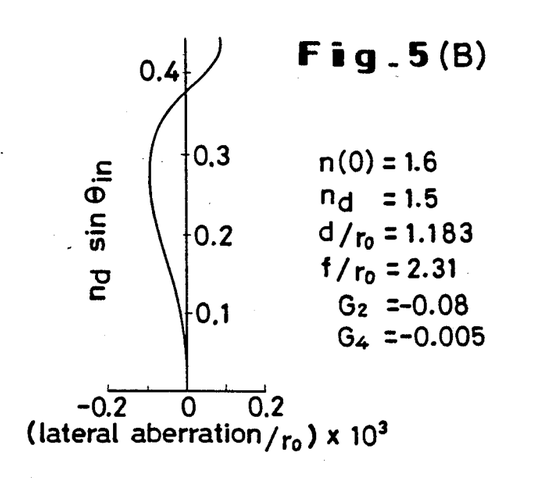
Figure 7A:
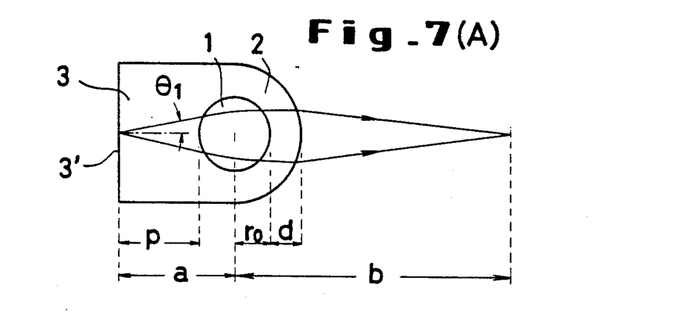
FIGS. 7(A) and 7(B) are a schematic explanatory diagram of the first embodiment of FIG. 4 and FIG. 5, illustrating the condition of the incidence of light issuing from a point light source positioned at the end surface of the rod clad, and a diagram showing the aberration characteristics.
Figures 7B, 8, 9A, 9B:
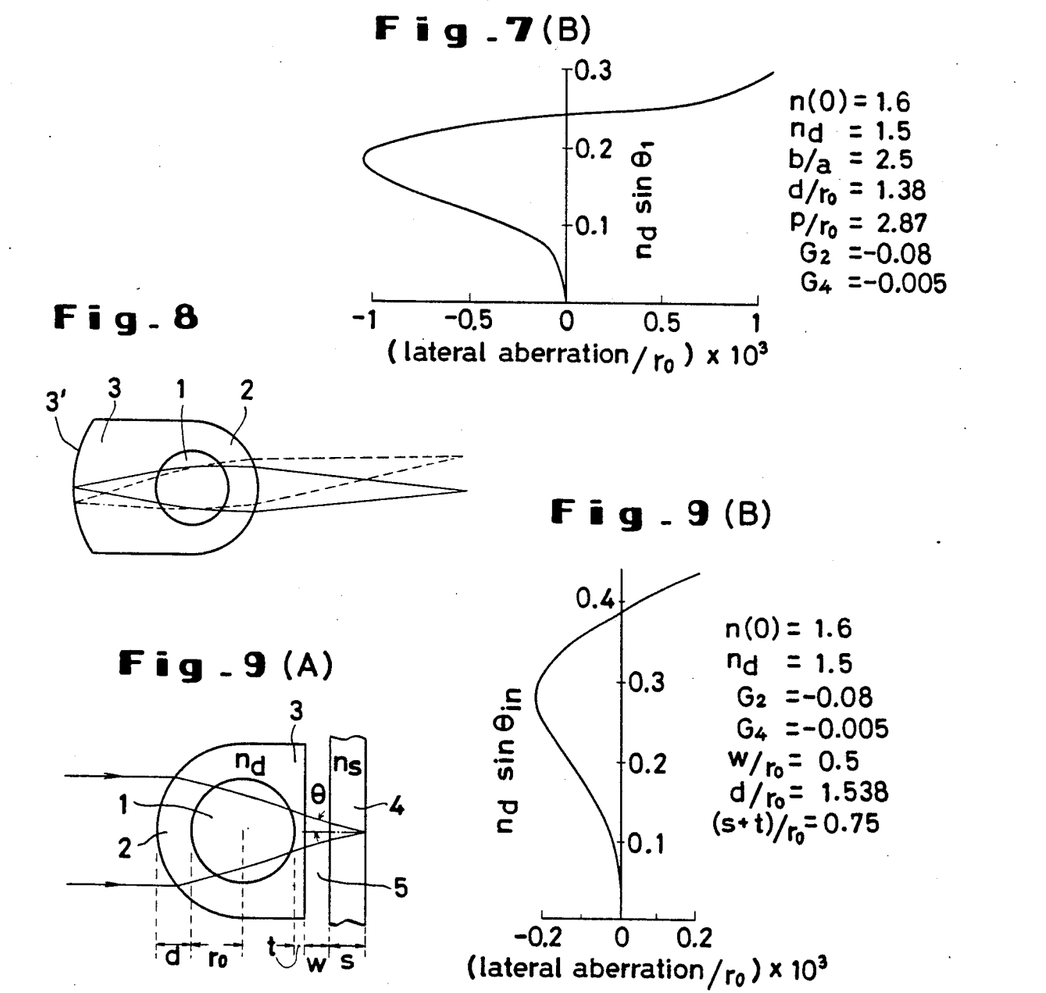
FIG. 8 is a schematic explanatory diagram of the construction of the lens of FIG. 7, having the end surface of the rod clad spherized.
FIGS. 9(A) and 9(B) are a schematic explanatory diagram of the construction of the third embodiment of the lens of this invention as applied to an optical pickup, and a diagram showing the aberration characteristics.

FIGS. 4(A) and 4(B) represent an optical system in which a collimated beam enters the rod clad 3 side, passes through the core 1, and forms an image at the position at which the beams depart from the spherical-shell clad 2, and the aberration involved in this optical system. FIGS. 5(A) and 5(B) illustrate an optical system in which a collimated beam enters the spherical-shell clad 2 side, passes through the core 1, and forms the image at the end face 3' of the rod clad 3, and the aberration involved in this optical system. FIGS. 7(A) and 7(B) illustrate an optical system in which a flux of rays from a point light source in the end surface 3' of the rod clad 3 form the image at the position at which the beams depart from the spherical-shell clad 2, and the aberration involved in this optical system.

Figure 6:
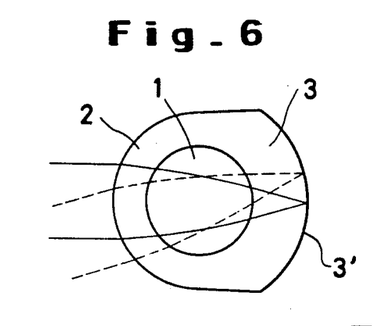
FIG. 6 is a schematic explanatory diagram of the construction of the second embodiment.

FIG. 6 represents another embodiment in which the end surface 3' of the rod of FIG. 5(A) is spherized. Owing to the spherization, the lens permits multiple utilization. The aberration characteristics of this embodiment are equivalent to those of FIG. 5(A). The embodiment of FIG. 8 is equivalent to that of FIG. 7(A). FIGS. 9(A) and 9(B) illustrate an optical system in which the rod clad 3 is intersected by a plane perpendicular to the optical axis and a gap (air layer) 5 is inserted, and the aberration involved in this optical system. This optical system is equalized in construction to an optical pickup by viewing the severed rod portion as a transparent protecting layer of the optical disk. This also applies to the cases in which the light source and the point of image formation change place in the aforementioned optical systems.

In the lenses of the various constructions described above, the refractive index distribution in the spherical cores of uneven refractive indexes is assumed to be represented by the following expression similarly to that in the spherical lens formerly proposed.

$$n^2(r)=n^2(0)[1+G_2(r/r_0)^2+G_4(R/R_0)^4]$$

wherein, $r_0$ stands for the core radius and $n(0)$ for the refractive index at the center, and $G_2$ and $G_4$ stand for the coefficients of second and fourth orders during the development of the polynomial and represent the extent of change of the refractive index from the center ($r=0$) to the periphery, $r=r_0$. The coefficients of the sixth and subsequent orders and those of the orders of odd numbers are assumed to be 0 on the condition that the refractive index is graded by spherical symmetry and it is distributed so as to decrease substantially in proportion to the square of the distance from the center. The difference in the refractive index is assumed to be about 5% ($G_2 \simeq -0.1$), a level which can be attained by the technique of ion exchange.

The clad is assumed to have an even refractive index $n_d$. The value of this index may be either greater or smaller than that of the refractive index $n(0)$, at the core center (assumed to be 1.6, to be specific). For practical purpose, the specific value, $n_d=1.5$, has been adopted on the assumption that a plastic material of good processibility and high thermoplasticity is available.

FIGS. 4 to 9 illustrate embodiments of spheric lenses of uneven refractive index distribution involving $G_2=-0.08$ and $G_4=-0.005$. Generally, the values of $G_2$ and $G_4$ are known only after measurement is performed on the products obtained by ion exchange. The graphs showing the relation between the thickness of clad required for the correction of aberration and the values of $G_2$ and $G_4$ are shown in FIGS. 10 through 13. They give the data of the optical systems of FIGS. 4(A), 5(A), 7(A) and 9(A) respectively. In the graphs of FIGS. 10 through 13, the solid line indicates the thickness of the spherical-shell clad required for the correction of aberration, the dot-and-dash line the residual lateral aberration involved correspondingly, and the dotted line the position of the focal point.

Figure 10:
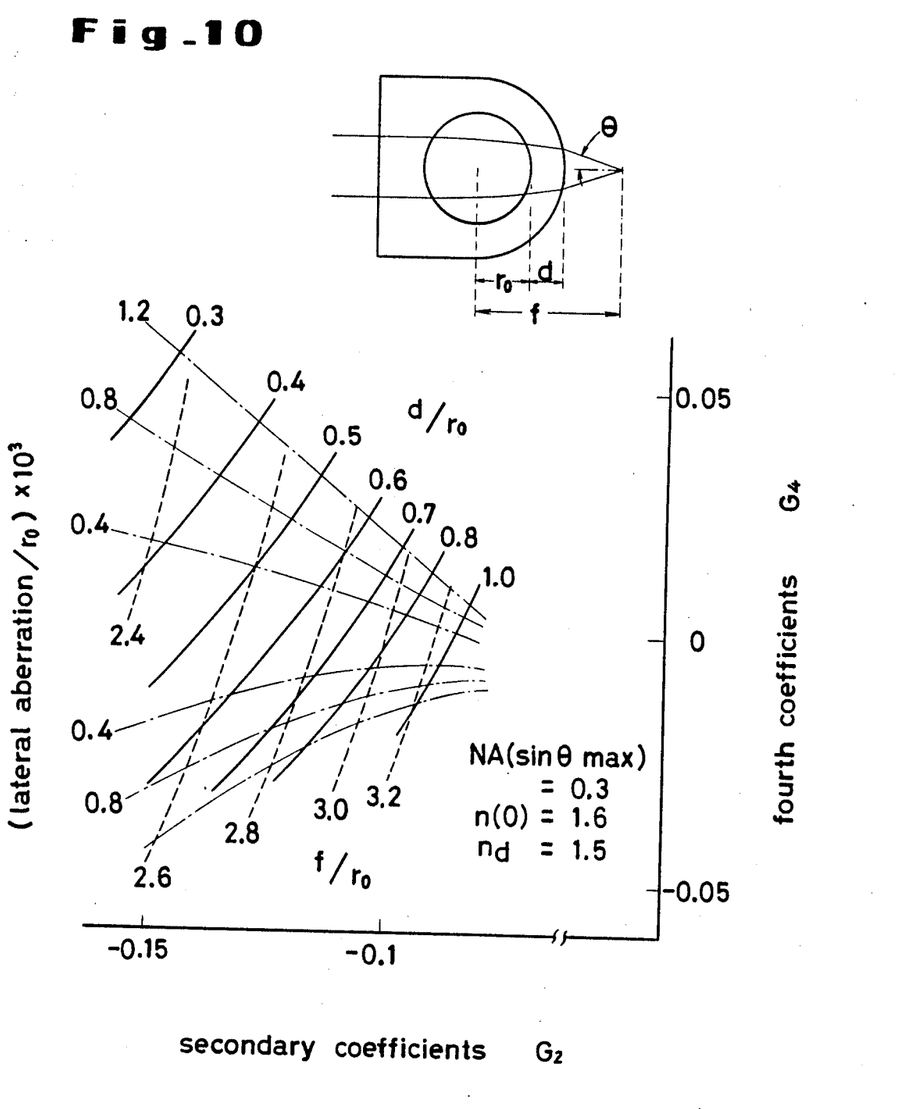
FIGS. 10, 11, 12 and 13 are characteristic diagrams showing the aberration correction characteristics relating to the coefficients of the second and fourth orders of the spherical cores in the lenses of FIGS. 4, 5, 7 and 9 respectively.
Figure 11:
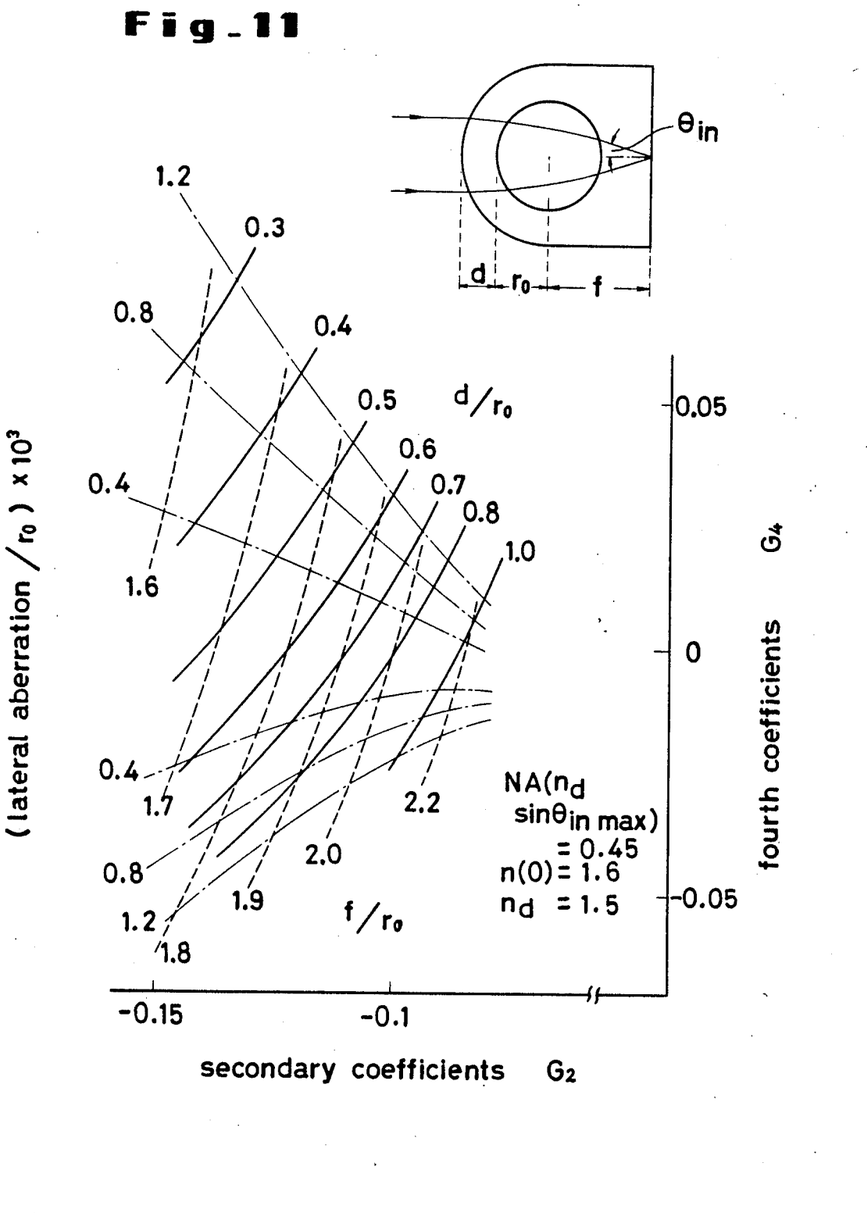

Comparison of the incidence of a collimated beam from the rod clad side illustrated in FIG. 10 and that of a collimated beam from the spherical-shell clad side illustrated in FIG. 11 reveals that the thicknesses of the spherical-shell clad required for the correction of aberration for given $G_2$ and $G_4$ are equal. It is further noted that the ranges of $G_2$ and $G_4$ which permit desired reduction of abberation despite the fact that the numerical apertures are fixed at a high levels, NA=0.45 for the latter and NA=0.3 for the former. The latter better suits the applications which require large numerical apertures. For the applications in which the beams of light are collimated on the rod clad side and the end surface of this clad is used for intimate integration with other elements such as, for example, interference membrane and diffraction lattice as will be described more fully afterward with reference to FIGS. 21 through 31, the former is more suitable.

To cite concrete numerical values with reference to the embodiment of FIG. 11, for example, when the spherical core of uneven refractive index distribution has a spherical radius of 1 mm and satisfies $G_2=-0.1$ and $-0.02 \leq G_4 \leq 0.02$, the lateral aberration can be held down below 1 $\mu$m if the spherical core is used with the numerical apertures NA=0.45. When fibers 7 are used for receiving the beams of light from the lens as illustrated in the applied cases of FIGS. 21 through 31, they can be expected to operate with amply high efficiency even if the fibers are of the single mode.

Figure 12:
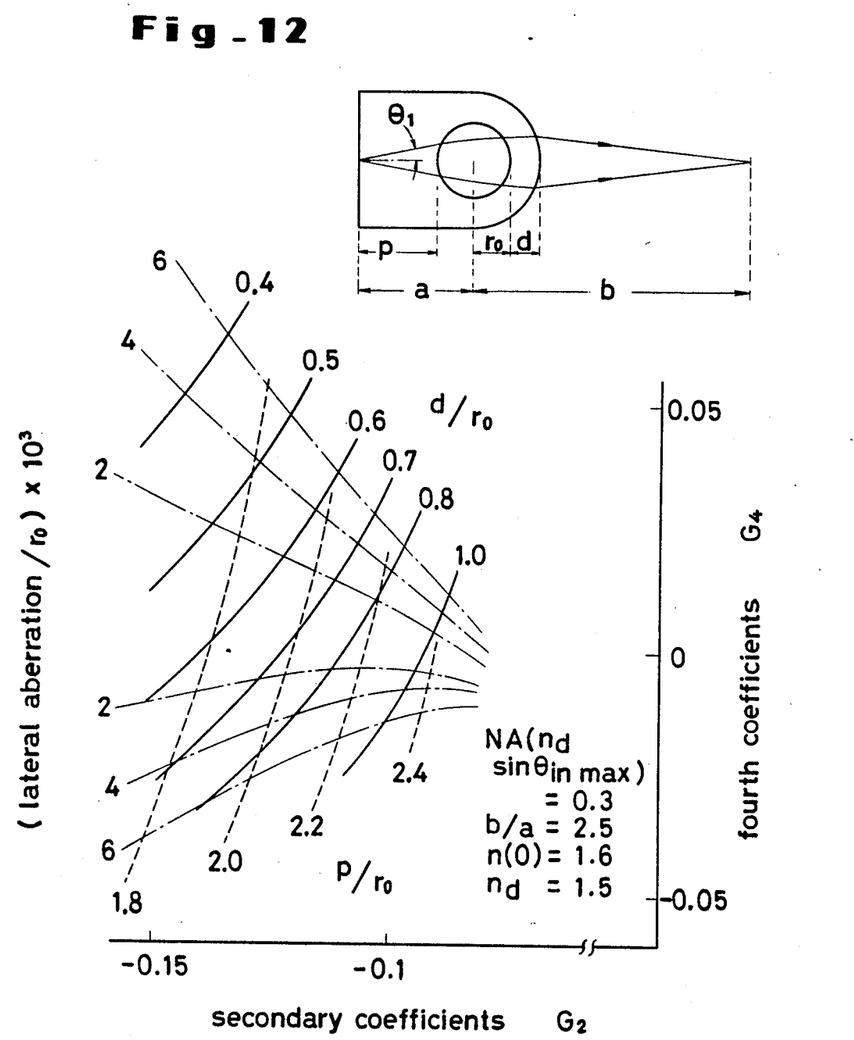

FIG. 12 illustrates an embodiment in which a flux of radiated beams from a light source are converged by one lens and launched into optical fibers, for example. Here, the numerical aperture on the rod clad side is fixed at 0.3 and that on the opposite side at 0.12. The residual aberration is order of ten higher than that involved in the embodiments of FIG. 10 and FIG. 11. Even then, it is not difficult to have the aberration confined into the core diameter (about 6 μm) of single-mode fibers by use of a spherical lens having a core radius of 1 mm.

Figure 13:
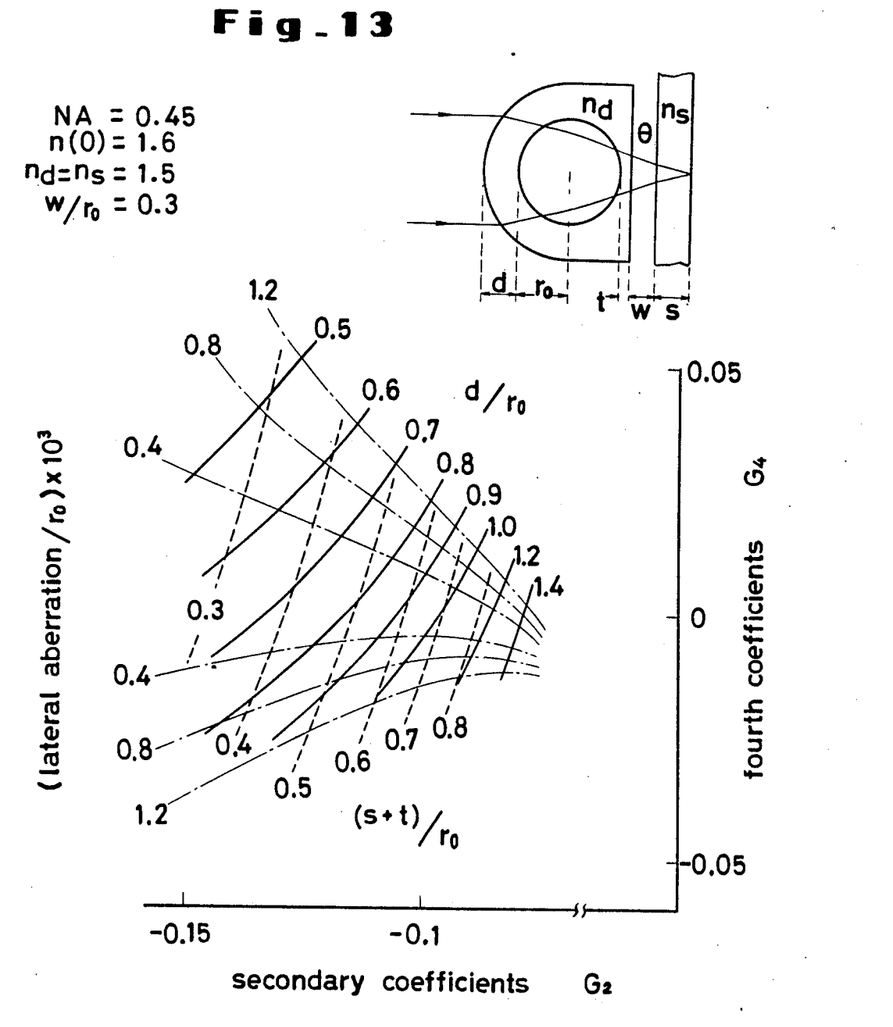

FIG. 13 illustrates the condition for the correction of aberration in the optical system which is assumed to be used in the optical pickup of FIG. 9. When FIG. 13 is compared with FIG. 11 which illustrates the condition for the correction of the optical system of FIG. 5, it is noted that for the spherical core of a fixed refractive index distribution, the former calls for a spherical-shell clad of a greater thickness. This is because the former has a gap (air layer) 5 in the rod clad and inevitably entails a negative aberration (a positive aberration when a planar refraction medium is disposed in the air layer) proportionately, and, for the correction thereof, requires the spherical-shell clad to be proportionally increased in thickness.

Figure 14:
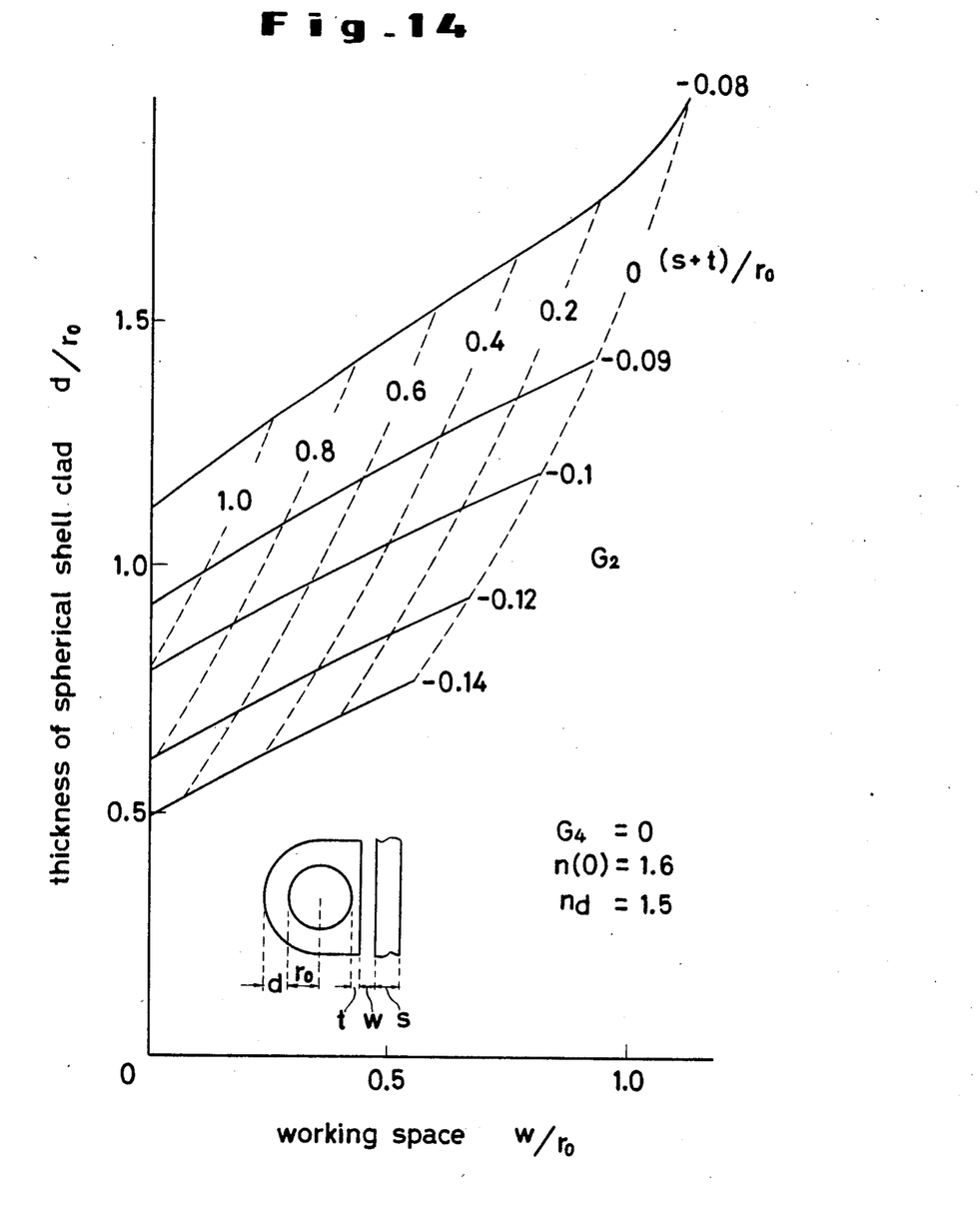
FIG. 14 is a graph showing the relation between the working space and the clad thickness of the optical pickup lens of FIG. 9(A).

FIG. 14 shows the relation between the working space $W/r_0$ based on the unit of $r_0$ and the thickness $d/r_0$, of the spherical shell clad needed. The parameter in this relation is the coefficient of second order $G_2$. In addition, $(s+t)/r_0$ is shown. Assume that the thickness of the disk is $s=1$ mm and the spherical radius is 2 mm, and the relation $(s+t)/r_0 \geq 0.5$ will be satisfied. In FIG. 14, this range is located in the left half. For $G_2 = -0.08$, for example, the gap W may be 1.2 mm.

FIG. 13 indicates that a lens having a lateral aberration of less than 1 μm at NA=0.45 can be formed with a spherical core having $r_0 = 2$ mm and $G_2 = -0.1$ or so and satisfying $-0.01 \geq G_4 \geq 0.01$. This is roughly equivalent to the diffraction limit of light, $D \approx \lambda/NA$ (about 2 μm or 1 μm in radius for $\lambda = 0.8$ μm). Thus, the lens may well be rated as a high-performance lens.

It is a problem of some importance whether the range of $G_4$ can be controlled by ion exchange or not. It is, therefore, proposed to convert $G_4$ to the coefficient of the fourth order $h_4$, based on the following expression of the refractive index distribution of the converging rod lens of cylindrically symmetrical distribution currently in actual manufacture.

$$n^2(r) = n^2(0)[1 - (gr)^2 + h_4(gr)^4]$$

From $G_2 = -(gr_0)^2$ and $G_4 = h_4(gr_0)^4$, $h_4 = G_4/G_2^2$ is found. By the substitution of $G_2 = -0.1$, $h_4 = 100 \cdot G_4$ is found. It follows that when $G_4$ has a small value, $h_4$ has a value two digits larger. Thus, the relation $-0.01 \leq G_4 \leq 0.01$ equals the relation $-1 \leq h_4 \leq 1$. From experience with the conventional ion-exchange, this range is not narrow by any standard. If an equivalent of this lens is to be materialized with a rod lens of cylindrically symmetrical refractive index distribution, then $h_4$ must be controlled accurately to within $\pm 0.01$ of a certain value. This fact proves that the lens of this invention makes an excellent converging lens.

Figure 15:
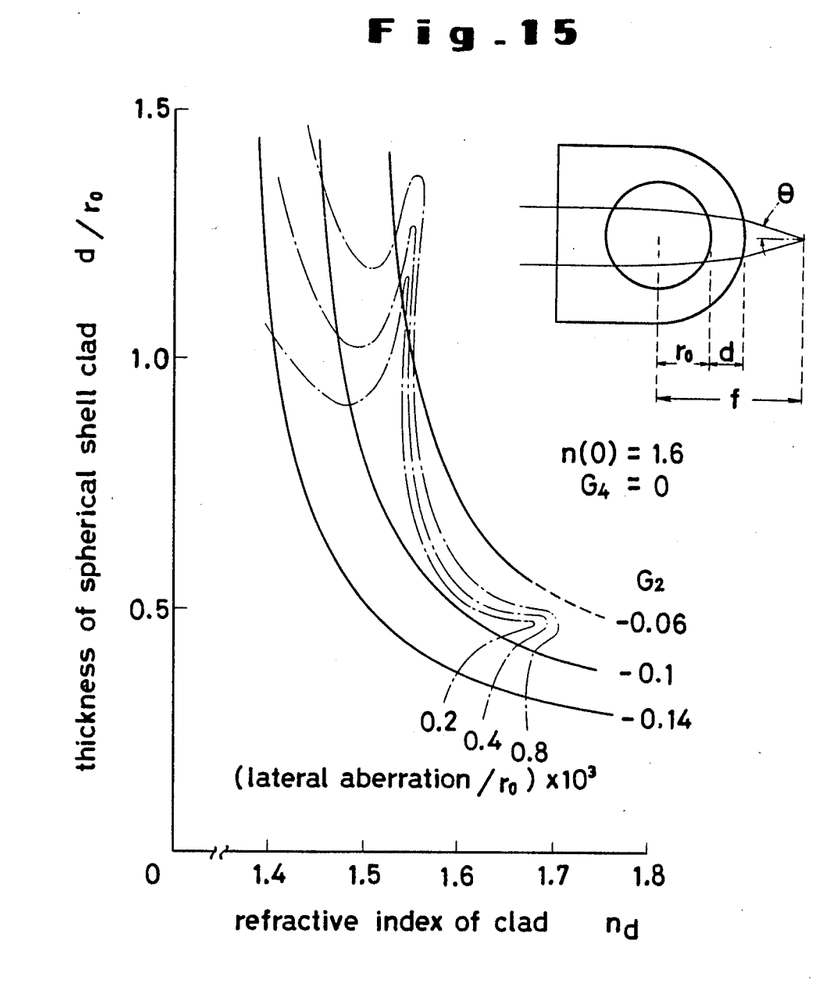
FIGS. 15 and 16 are graphs showing the relation between the refractive index of the clad and the thickness of the spherical shell clad required for aberration correction obtained in the optical systems of FIGS. 4 and 5 with the coefficient $G_2$ of the second order used as the parameter and additionally showing the residual lateral aberration.
Figure 16:
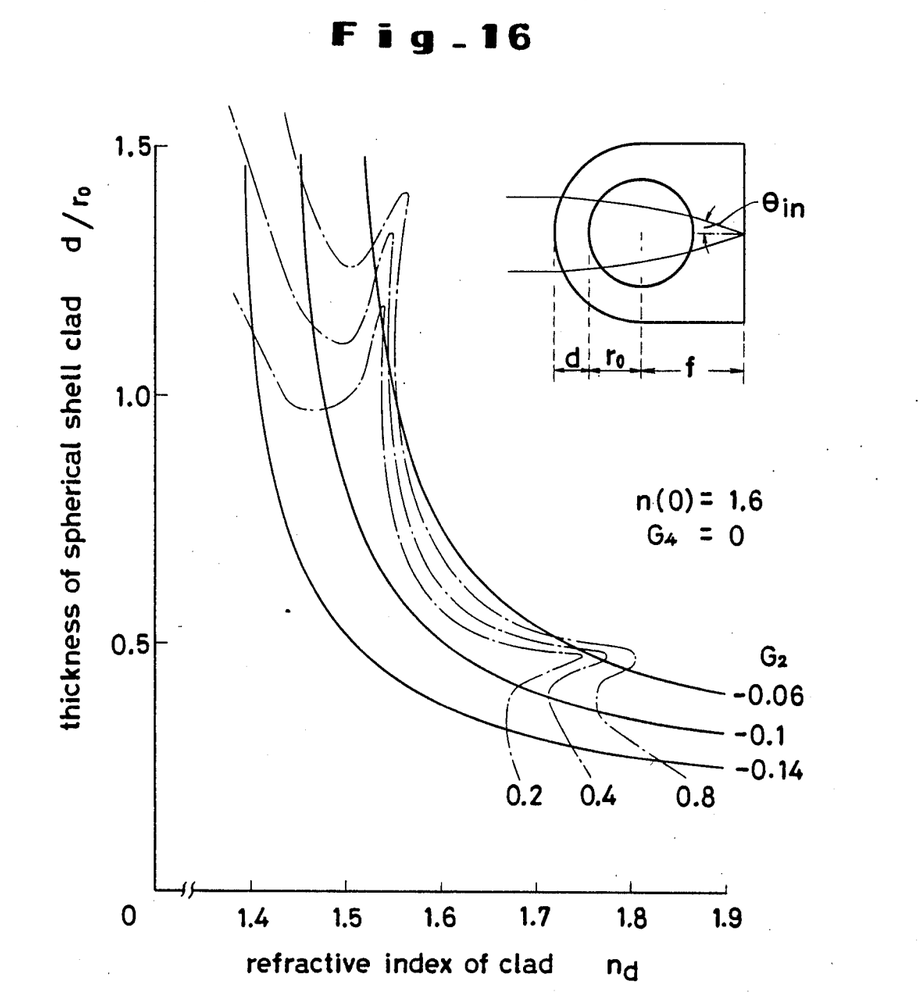

So far, the typical values of $n(0) = 1.6$ and $n_d = 1.5$ have been discussed. These values are feasible because the present invention contemplates effective use of a plastic clad for a spherical core of glass. Depending on the condition of the use of lens, it becomes necessary to make the thermal expansion coefficient of the clad material equal to that of the spherical core. It is necessary to use a glass material and it is also important to seek the most effective $n_d$. FIGS. 15 and 16 are graphs which show the relation between the condition for the correction of aberration and the refractive index $n_d$ of the clad. These data are for the optical systems of FIGS. 4(A) and 5(A) respectively.

In the graphs of FIGS. 15 and 16, it is noted that the thickness of the clad necessary for the correction of aberration which is indicated by the vertical axis decreases in proportion as the refractive index $n_d$ of the clad indicated in the horizontal axis increases. Here, the parameter is the coefficient of second order $G_2$. For the sake of simplicity, the coefficient of fourth order $G_4$ is assumed to be 0. The residual aberration indicated by the dot-and-dash line increases where the value of $n_d$ is small and large and where the absolute value of $|G_2|$ is small. A careful review will show that characteristically hornlike regions appear on both sides of the value of $n(0) = 1.6$. This fact implies that even with a spherical core having a weak distribution ($|G_2|$ is small), the aberration can be kept small by suitably selecting the refractive index of the clad. Of these two regions, the one which has a smaller value of $n_d$ is found to represent the case in which the refractive index is graded continuously without any sudden bend from the periphery of the spherical core of uneven refractive index distribution to the clad. This gradation resembles that of the aberration-free Luneburg lens of uniform spherical shell analytically found by Toraldo and Morgan. The refractive index distribution of the spherical core worked out by analysis is complicated and hardly seems feasible. The procedure of treating the spherical core as by ion exchange and attaching thereto a clad suited to the particular distribution involved constitutes the basis for design. Incidentally, where the value of $n_d$ is large, the gradation of the refractive index between the spherical core and the clad is large even if the absolute value $|G_2|$ is small. Even at the limit of $G_2 \to 0$, namely where the spherical core has no distribution, the aberration can be decreased by attaching a clad of a large refractive index. A lens answering this particular situation has been discovered by Toraldo. FIGS. 15 and 16 embrace the specific lenses described above and depict the whole aspect needed for the purpose of design.

Figure 17:
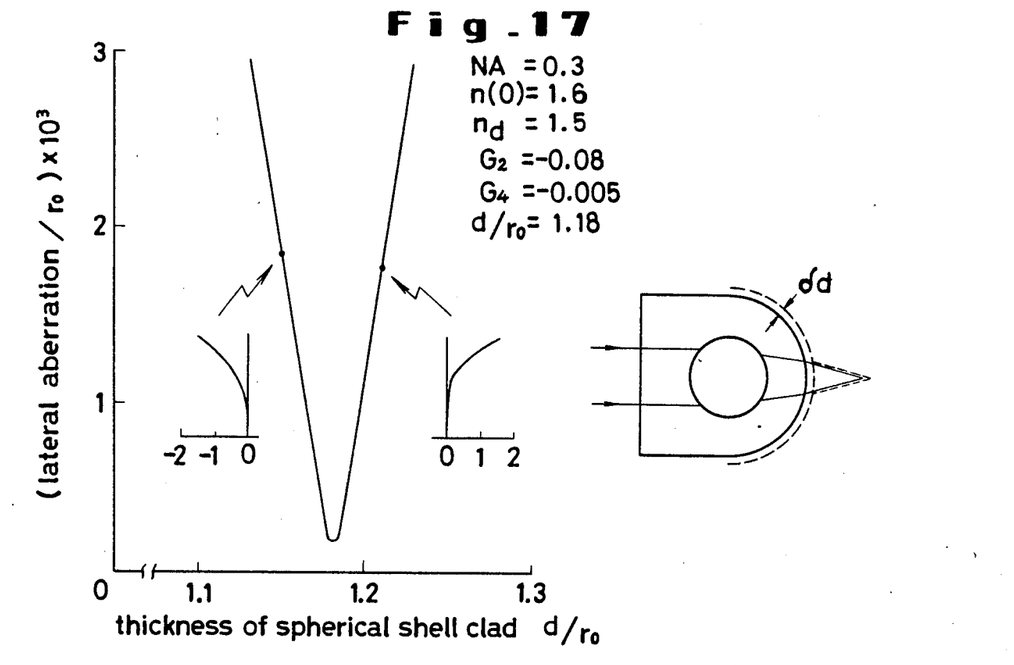
FIGS. 17 and 18 are graphs showing the relation between the accuracy of manufacture of the thickness of the spherical shell clad and the aberration obtained of the lenses of FIGS. 4 and 5, respectively.
Figure 18:
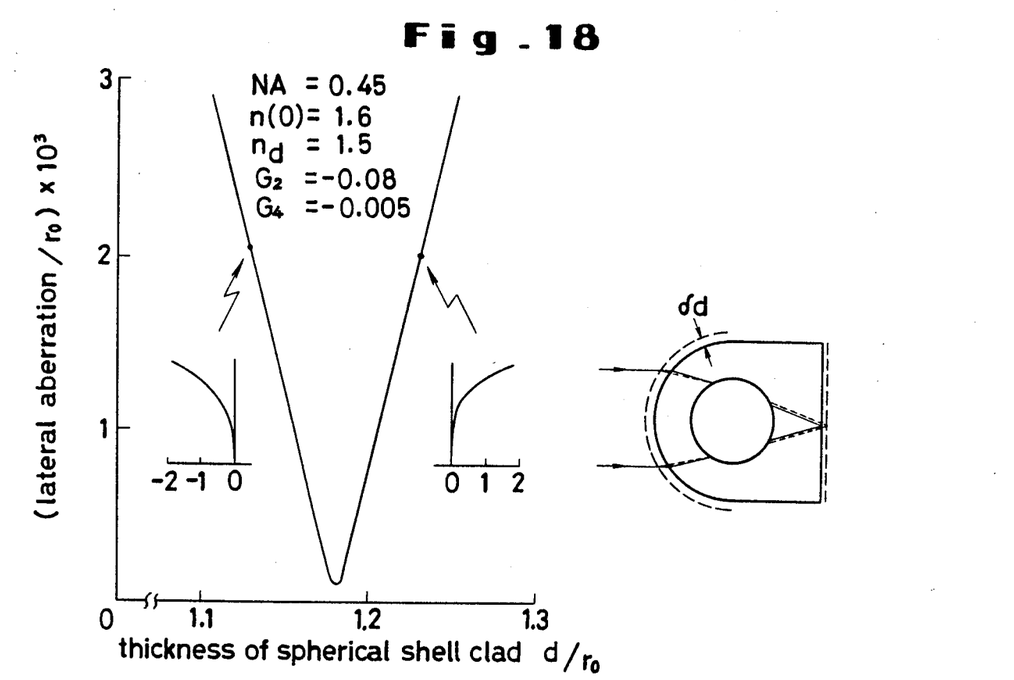
Figure 19:
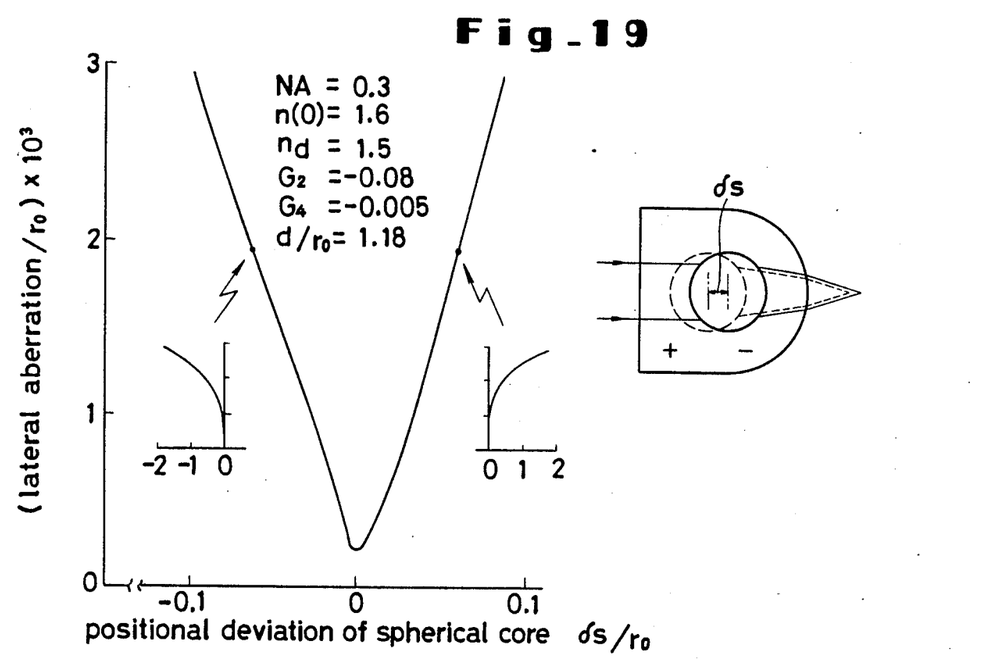
FIGS. 19 and 20 are graphs showing the relation between the positional deviation in the direction of the optical axis of the spherical centers and the aberration of the clads of the lenses of FIGS. 4 and 5, respectively.
Figure 20:
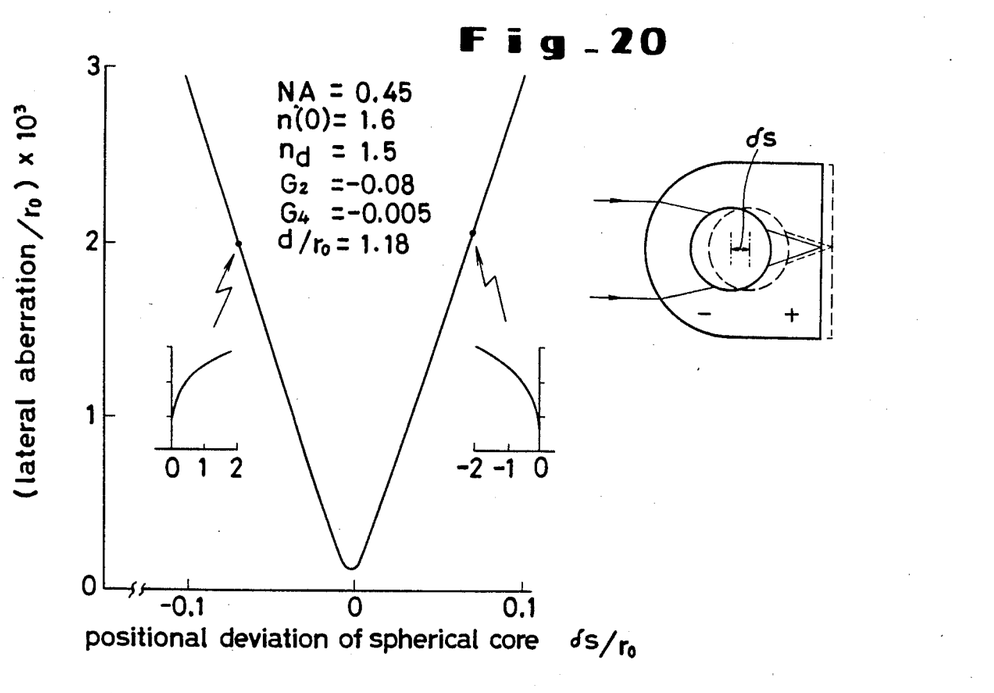

To furnish information on the selection of the thickness of clad, the accuracy of manufacture as to the positional deviation of the spherical core in the clad and so on, which are needed for the manufacture of the lens, FIGS. 17 and 18 illustrate the conditions of increase of aberration against the thickness of clad and FIGS. 19 and 20 illustrate those of increase of aberration against the positional deviation of the spherical core in the direction of the optical axis in the clad. For the lens used in optical communication to confine the aberration to within the core diameter of about 6 μm in single mode fibers, it is sufficient to limit the lateral aberration to within 3 μm, i.e. one half of the value mentioned above. If a spherical core having a radius $r_0 = 1$ mm is to be used in the embodiment of FIG. 18, for example, the thickness of the clad is required to have an accuracy of $\pm 80$ μm. In the case of the spherical core of FIG. 20, it is sufficient to limit the positional deviation to within $\pm 100$ μm. If the lens is to be used for an optical pickup, then it becomes necessary to limit the lateral aberration to within the limits of diffraction, i.e. within about 1 μm. For the radius $r_0 = 2$ mm, it is noted from FIG. 18 that the thickness of clad should be limited to within about $\pm 30$ μm and also that the positional deviation of the spherical core to within $\pm 40$ μm. For the manufacture of a high-performance lens, these manufacturing tolerances can be fixed within relatively wide ranges. Such generous tolerances prove advantageous from the standpoint of lens manufacture. (Although the information on the optical pickup lens requires data about the optical system of FIG. 9(A) which incorporates a gap in the rod clad, the information obtained with an optical system devoid of the gap has been used herein as a substitute.)

It has been demonstrated that the lens of this invention has a relatively simple construction, suits mass production, and permits ample reduction of aberration for its numerical apertures. Further, the fact that, as compared with the conventional lens formed solely of a spherical-shell clad, the lens of this invention permits intimate integration with other elements easily, and is capable of multiple utilization, will be described with reference to the applications illustrated in FIGS. 21 through 31.

It should be noted here that this invention relates to the lens itself which is constructed as described above and how this lens should be utilized is a question to be left to the discretion of the user. Thus, FIGS. 21 through 31 merely illustrate general constructions of various applications.

Figure 21:
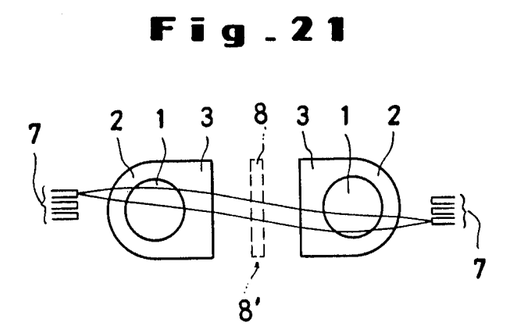
FIGS. 21 through 31 are schematic explanatory diagrams of the constructions of various optical systems using the lens of this invention as described in Examples 4 through 14.
Figure 22:
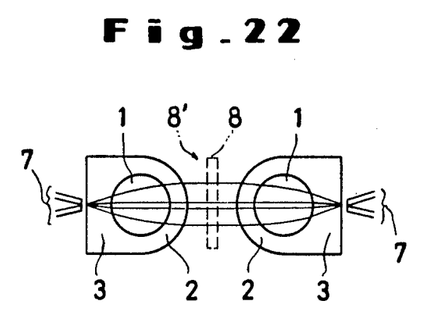
Figure 23:
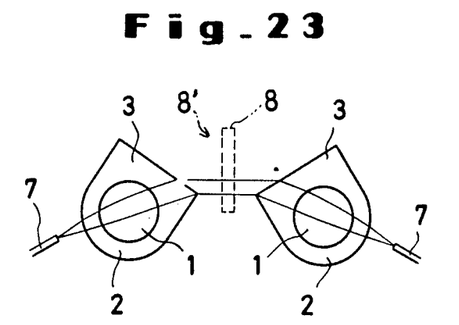

FIGS. 21, 22 and 23 illustrate typical applications of the lens of this invention to insertion devices which prove highly useful where spaces 8' are needed for the insertion of other elements 8 such as reflecting elements, diffraction elements, interference means, modulation elements, optical switches, and isolaters as between optical fibers 7, between light sources and fibers, or among light receivers. In all these applications, one pair of lenses of this invention is used.

Figure 24:
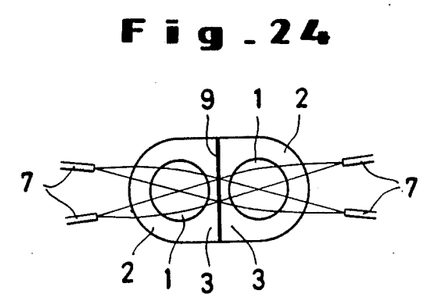
Figure 25:
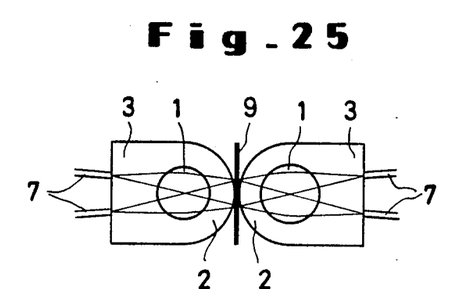

The applications of FIGS. 24 and 25 involve directional couplers using a pair of lenses of this invention, with a beam splitter 9 interposed therebetween. For physical union of the abutting surfaces of the pair of lenses and the beam splitter 9, a suitable known adhesive agent may be used.

Figure 26:
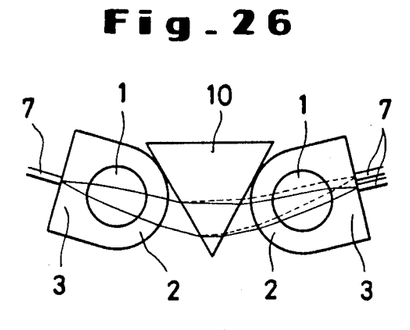
Figure 27:
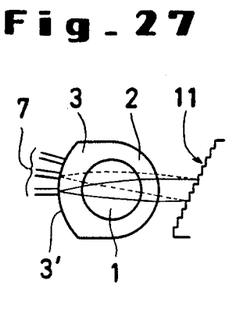
Figure 28:
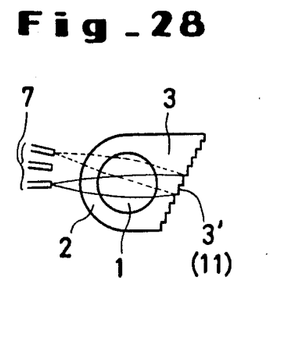

FIGS. 26, 27 and 28 represent applications in which the lens of this invention is utilized as a wave multiplexer or wave demultiplexer. In FIG. 26, a prism 10 is inserted between spherical-shell type clads 2. In FIG. 27, a spherical-shell type clad 2 is opposed to a diffraction grating 11. The end surface 3' of the rod clad is spherized as described above and the group of fibers 7 are disposed radially relative to the spherized end surface. In FIG. 28, the end surface 3' of the rod clad itself is utilized as a diffraction grating 11 as by means of a suitable groove forming technique.

Figure 29:
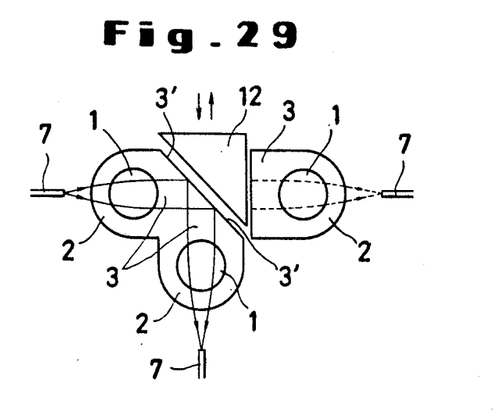

In the optical switch of FIG. 29, two lenses of this invention are perpendicularly crossed at the portion of the rod clad, with their end surfaces 3' collectively cut aslant. Normally, these slanted sections are used as total reflection surfaces and are caused to assume an injection-projection relationship between the two lenses. By selectively inserting transmitting members 12 having surfaces complemental to the slanted surfaces, the paths of light can be switched to the other optical fiber through the medium of another lens of this invention.

Figure 30:
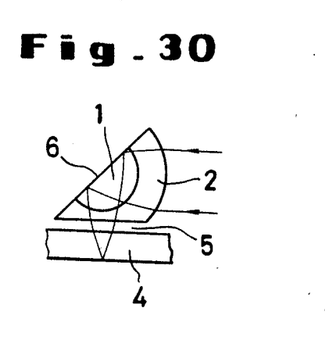

FIG. 30 represents an application of the lens of this invention as the optical pickup described above. In this case, a semispherical core 1 is used to impart the relationship of perpendicularity between the light paths established through the medium of this lens and the plane 6 of the semispherical core containing the diameter is utilized as the reflecting surface so as to lower the height of the lens enough to suit lateral insertion into the narrow spaces between the disks piled up one on top of another. The transparent protecting layer 4 of the optical disk through the medium of the gap 5 may well be regarded as part of the rod clad 3.

Figure 31:
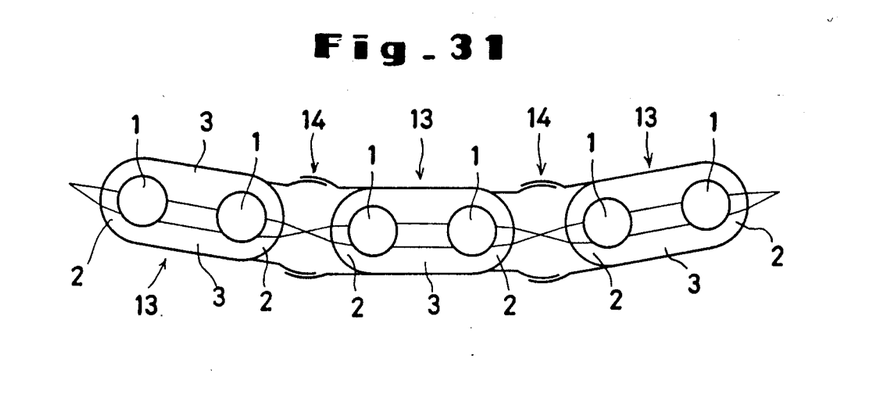

FIG. 31 illustrates a case wherein a flexible optical energy guide device is constructed. In this case, the adjacent ends of cylindrical housings 13 are interconnected with spherical universal joints 14 and two lenses of this invention are set back to back in each of the housings.

This device has not only the function of a flexible guide but also the function of converging the beams of light at the ends of the guide paths. It can be applied ideally to the laser scalpel, for example, without requiring use of other converging elements.

As described above, the present invention can provide a multi-functional small lens which has outstanding optical characteristics, enjoys high freedom of combination with other elements, and permits integration with other elements.

What is claimed is:

1. A lens comprising a core having refractive index distribution graded sphere-symmetrically in proportion to the distance from the center thereof and provided on at least one part of the periphery thereof with a spherical surface capable of passing beams of light in and out, a clad of the shape of a spherical shell provided on the light inlet or outlet side of the spherical surface of said core, possessed of uniform refractive index and designed so as to minimize the spherical aberration relative to at least the coefficients of the second and fourth orders in the development of the polynominal representing the refractive index of the said core, and a rod clad provided on the remaining one of said light inlet and outlet sides of the spherical surface of said core and possessed of uniform refractive index.

2. The lens according to claim 1, wherein the thickness of the clad of the shape of a spherical clad is selected so as to minimize the spherical aberration relative to at least the coefficients of the second and fourth orders in the development of the polynomial representing the refractive index of said core.

3. The lens according to claim 1, wherein the length of the clad of the shape of a spherical shell is selected so as to minimize the spherical aberration relative to at least the coefficients of the second and fourth orders in the development of the polynomial representing the refractive index of said core.

4. The lens according to claim 1, wherein said core is formed in the shape of a sphere and said spherical-shell type clad and said rod clad are disposed on the periphery of said core as opposed to each other across said core.

5. The lens according to claim 1, wherein said core is formed in the shape of a hemisphere.

6. The lens according to claim 1, wherein the end surface of said rod clad is spherized.

7. The lens according to claim 1, wherein said rod clad is divided by having a gap formed therein.

8. The lens according to claim 5, wherein the plane crossing the center of said core formed in the shape of a hemisphere is used as a reflecting surface and said spherical-shell type clad and said rod clad are formed on the spherical part of said core.

9. The lens according to claim 1, wherein a diffraction grating is provided on the end face side of said rod clad.

10. The lens according to claim 1, wherein a multiplicity of pairs of lenses having their rod clads joined back to back are interconnected with spherical joints and applied to a flexible light transmission path.

* * * * *